No. 865,776. PATENTED SEPT. 10, 1907.
B. GEORG.
COFFEE POT.
APPLICATION FILED APR. 15, 1907.

WITNESSES:
A. H. Rabsag,
K. H. Butler

INVENTOR
Bernáth Georg,
BY H. C. Evert & Co.,
Attorneys

UNITED STATES PATENT OFFICE.

BERNÁTH GEORG, OF CINCINNATI, OHIO.

COFFEE-POT.

No. 865,776.

Specification of Letters Patent.

Patented Sept. 10, 1907.

Application filed April 15, 1907. Serial No. 368,359.

*To all whom it may concern:*

Be it known that I, BERNÁTH GEORG, a citizen of the United States of America, residing at Cincinnati, in the county of Hamilton and State of Ohio, have invented certain new and useful Improvements in Coffee-Pots, of which the following is a specification, reference being had therein to the accompanying drawing.

This invention relates to coffee pots, and the invention relates more particularly to certain improvements in coffee pots disclosed in my application for patent filed February 1st, 1907, Serial No. 355,258, the invention having for its object to provide a novel coffee pot having a detachable receptacle for coffee, said receptacle being so disposed within the coffee pot as to insure the extraction of the essence of the coffee by steam and hot water, the coffee grounds or grains being prevented from commingling with the extracted essence by a screen detachably mounted upon the coffee receptacle.

My improved coffee pot is used in connection with a conventional form of gas burner, and I provide a novel housing for supporting the coffee pot over the burner, whereby water can be heated within the coffee pot for extracting the essence of coffee placed therein.

The detail construction entering into my invention will be hereinafter more fully described and then specifically pointed out in the appended claims.

Figure 1:
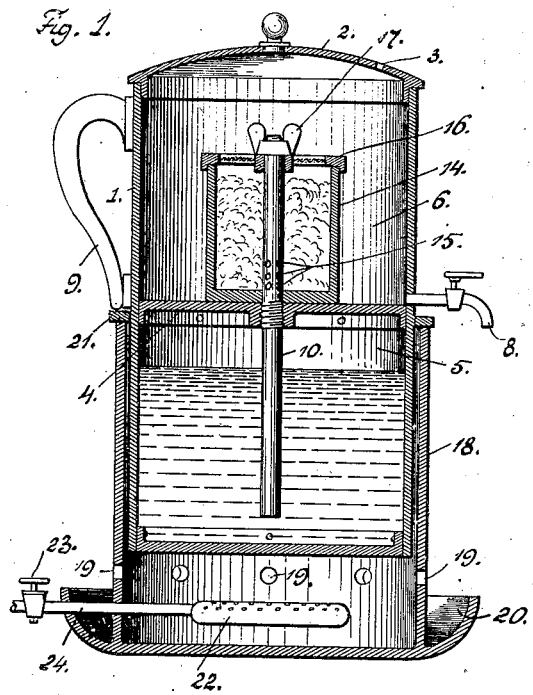
Figure 2:
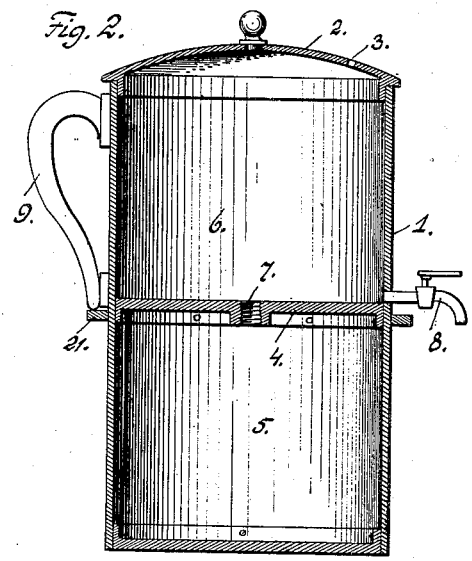
Figure 3:
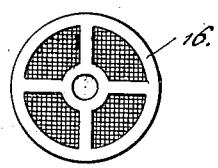
Figure 4:
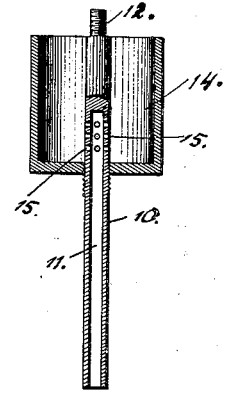

In the drawing, Figure 1 is a vertical sectional view of my improved coffee pot illustrating the same supported over a burner, Fig. 2 is a similar view of the coffee pot proper, the coffee receptacle thereof being removed, Fig. 3 is a plan of a screen or closure used in connection with the coffee receptacle, Fig. 4 is a vertical sectional view of the coffee receptacle.

To put my invention into practice, I construct my improved coffee pot of a vessel 1 having a detachable lid 2 provided with an opening 3 for the escape of steam or gases generated within the upper part of the vessel 1. The vessel is provided with a horizontal partition 4 dividing the same into a water compartment 5 and a coffee compartment 6. The partition 4 is provided with a central threaded opening 7, the object of which will presently appear.

The vessel 1 is provided with a faucet 8 for withdrawing coffee from the compartment 6, also with a handle 9 whereby the coffee pot can be easily carried.

In the threaded opening 7 of the partition 4 is detachably mounted a rod 10 having a bore 11 formed therein, extending from its lower end to within close proximity to the upper end of the rod, which is reduced in diameter and threaded as at 12. Carried by and surrounding the upper end of the rod 10 is a coffee receptacle 14 which is in communication with the bore 11 of the rod 10 by a plurality of radially disposed openings 15 formed in said rod.

When the rod 10 is mounted in the partition 4, its lower end is in close proximity to the bottom of the vessel 1. Upon the contracted threaded end 12 of the rod I mount a closure or screen 16, said closure or screen being detachably held upon the coffee receptacle 14 by a winged nut 17.

In connection with the coffee pot, I use a cylindrical housing 18 having a plurality of openings 19 near its base, and a circumferentially arranged drip basin 20. The lower half of the vessel 1 is supported in the cylindrical housing 18 by a circumferentially arranged flange or bracket 21 secured to the sides of the vessel 1. In the cylindrical housing 18 is suitably supported a gas burner 22, the admission of gas to said burner being controlled by a conventional form of valve 23 located upon the gas supply pipe 24.

Prior to placing the rod 10 and coffee receptacle 14 in engagement with the partition 4, I place water in the compartment 5 of the vessel 1, the water being used for extracting the essence from the coffee placed within the receptacle 14. After the water has been placed within the compartment 5 of the vessel 1, the rod 10 is screwed into the partition 4, the receptacle 14 carried by said rod having been previously filled with coffee, and the screen or closure 16 placed in position.

Assuming that the gas of the burner 22 has been lighted, by placing a match in one of the openings 19, the manner in which the water in the compartment 5 extracts essence from the coffee within the receptacle 14 is as follows: The steam generated by the boiling water within the compartment 5 forces the water upwardly through the bore 11 of the rod 10, through the openings 15 into the coffee within the receptacle 14. As the boiling water rises within the receptacle 14, the essence of the coffee is extracted before the water flows through the screen or closure 16 into the compartment 6. The screen or closure 16 prevents the coffee within the receptacle 14 from commingling with the extracted essence contained within the water within the compartment 6.

It will be apparent from the illustration of my invention that I have devised a simple and inexpensive coffee pot for insuring a perfect extraction of the essence from coffee, the coffee pot being easily kept in a sanitary condition on account of easy access being had to the same by removing the coffee receptacle 14 and the rod 10.

The openings 19 insure a perfect combustion of the gas beneath the coffee pot.

The drip basin 20 of the housing 18 is provided in case the steam passing through the opening 3 of the lid 2 should condense and flow down the sides of the coffee pot.

What I claim and desire to secure by Letters Patent, is:—

In a coffee pot, a vessel having a horizontal partition approximately midway the height thereof and provided with a centrally threaded aperture, a rod threaded through said aperture and having a hollow lower end projecting into the compartment below said horizontal partition and provided with perforations at the upper end of its hollow portion, a receptacle having closed sides and bottom mounted on said rod and resting upon and supported by said horizontal partition and having communication with the compartment below said partition through said perforations and the hollow portion of said rod, a perforated top for said receptacle, the said rod being extended through said perforated top, and detachable means on the upper end of the rod for securing the top in position.

In testimony whereof I affix my signature in the presence of two witnesses.

BERNÁTH GEORG.

Witnesses:
  A. H. RABSÁG,
  A. J. TRIGG.